United States Patent Office 3,649,693
Patented Mar. 14, 1972

3,649,693
AROMATIC AMINE ALKYLATION PROCESS
John P. Napolitano, Royal Oak, Mich., assignor to
Ethyl Corporation, New York, N.Y.
No Drawing. Filed May 2, 1969, Ser. No. 821,461
Int. Cl. C07c 85/00
U.S. Cl. 260—578
18 Claims

ABSTRACT OF THE DISCLOSURE

Aromatic amines such as aniline are selectively orthoalkylated by reaction with an olefin in the presence of an aluminum anilide catalyst. The orthoalkylated product is distilled from the reaction mixture without prior hydrolysis and residue remaining can be recycled as catalyst to a subsequent orthoalkylation process.

BACKGROUND

Methods of orthoalkylating aromatic amines such as aniline are known. Suitable methods are disclosed by Stroh et al. in U.S. 2,762,845, Kolka et al. in U.S. 2,814,-646, and again by Stroh et al. in U.S. 3,275,690. In Stroh et al. 2,762,845 the alkylation is carried out with an olefin in the persence of aluminum. The alkylated amine is recovered by steam distillation, which concurrently hydrolyzes the catalyst. Kolka et al. effect the alkylation using an olefin in the presence of an aluminum anilide catalyst. They also recover their product by hydrolzing the catalyst and then distilling the mixture. Likewise, Stroh et al. 3,275,690 carry out of the alkylation using olefin and a Friedel-Crafts catalyst and recover the product by decomposing the reaction mixture with water, making the mixture alkaline and separating the amine mixture with steam. Accordingly, the prior art methods all envision recovery of the alkylated amine by hydrolysis of the reaction mixture followed by distillation.

SUMMARY

It has now been found that when an aromatic amine having at least one hydrogen atom on a carbon atom ortho to an amino group and having at least one hydrogen atom on the amino group is alkylated with an olefin using an aluminum anilide catalyst, the desired orthoalkylated aromatic amine can be recovered in high yield and purity without the necessity of first hydrolyzing the reaction mixture. Indeed, the purity of the product obtained with but a simple distillation of an unhydrolyzed reaction mixture is significantly higher than that obtained if the reaction mixture was first hydrolyzed. Accordingly, an object of the invention is to provide a process for making orthoalkylated aromatic amines which gives a high purity product with only a simple distillation of the reaction mixture.

DESCRIPTION OF THE PREFERRED EMBODIMENTS

The above and other objects are accomplished by providing a process for selectively orthoalkylating the nucleus of an aromatic amine having at least one hydrogen atom on a carbon atom ortho to an amino group and having at least one hydrogen atom on said amino group, said process comprising:

(A) heating said aromatic amine with an olefin in the presence of an aluminum anilide catalyst to a temperature of from about 150–500° C., thereby forming a reaction mixture containing orthoalkylated aromatic amines, and (B) distilling said orthoalkylated aromatic amines from said reaction mixture without hydrolysis.

Although not bound by any theory, it is believed that the higher purity is obtained because the aluminum anilide type catalyst is in a state of dynamic equilibrium with both the unreacted aromatic amine and the alkylated aromatic amine. Either type of aromatic amine can be bound to aluminum to form the aluminum anilile type catalyst. However, the results obtained indicate that the less alkylated aromatic amine is preferentially bound to aluminum. For example, when aniline is alkylated with ethylene using an aluminum anilide catalyst, the final reaction mixture is predominantly 2,6-diethylaniline, with any aniline or orthoethyl aniline which might normally be present in a hydrolyzed reaction product bound to aluminum as the aluminum anilide type catalyst. It has been discovered that the alkylated aniline can be distilled from the alkylation mixture containing the active catalyst without rearranging or decomposing the product and that, although it has a lower boiling point, very little of the unalkylated starting material is carried over in the simple distillation. Indeed, in the case of the ethylation of aniline a product has been obtained by a simple distillation of an alkylation reaction mixture without hydrolysis which assayed 97.4 percent 2,6-diethylaniline. By the prior art methods, in which the alkylation mixture is first hydrolyzed, the purity would be substantially less and the above purity could only be obtained through a subsequent fractional distillation, which adds to the cost of the product.

As a further benefit flowing from the invention, it has been found that residue remaining after the simple distillation can be recycled and again employed as the aluminum anilide type alkylation catalyst. This permits further economies by eliminating the catalyst preparation step.

The process can be carried out on any aromatic amine that (1) has at least one hydrogen atom on a carbon atom ortho to an amino group, and (2) has at least one hydrogen atom on the amino group. In other words, the process is applicable to primary or secondary aromatic amines having at least one unsubstituted ortho position. These include both mono- and poly- nuclear aromatic amines as well as mono- and poly- amino aromatic amines. Suitable amines include the amino benzenes, amino naphthalenes, amino anthracenes, amino phenanthrenes, amino crysenes, amino pyrenes, and the like.

The aromatic amines can also have other nuclear substituents such as alkyl, aryl, alkaryl, aralkyl, cycloalkyl, substituted-cycloalkyl, halogen, alkoxy, aryloxy, and the like. Likewise, the nuclear substituents may form a closed ring such as in the case of indene. All that is required is that at least one position ortho to the amine radical is unsubstituted except for hydrogen, and that the amine nitrogen atom have at least one hydrogen atom bonded thereto. Of the various aromatic amines, the preferred are the mono-, di- or tri-nuclear amines. In particular, the amino benzenes are most useful.

Examples of suitable amines include:

m-toluidine
o-toluidine
4-isobutylaniline
4-sec-eicosylaniline

N-methylaniline
2-tert-butylaniline
4-phenylaniline
4-α-methylbenzylaniline
4,4'-methylenebisaniline
4,4'-isopropylidenebisaniline
p-phenylenediamine
N,N'-dimethyl-p-phenylenediamine
6-sec-eicosyl-α-naphthylamine
α-naphthylamine
β-naphthylamine
N-methyl-α-naphthylamine
α-aminoanthracene
3-aminophenanthrene
7-aminoindene
1-aminochrysene
2-aminopyrene
4-cyclohexylaniline
4-phenylaniline The most preferred amines are the mononuclear aromatic amines, especially the primary and secondary amino benzenes, referred to collectively as anilines. Examples of these are:

aniline
N-methylaniline
N-ethylaniline
p-sec-docosylaniline
p-methoxyaniline
p-bromoaniline
N-butyl-m-bromoaniline Of these, the most preferred aromatic amine is aniline itself.

The olefins useful in the process include olefins which are both mono- or poly-unsaturated, cyclic or acyclic, substituted or unsubstituted, and both terminal and internal olefins. Examples of acyclic monoolefins are ethylene, propylene, butene-1, butene-2, isobutene, pentene-1, isopentene, pentene-2, hexene-1, hexene-2, 2-methyl pentene-1, 2-methyl pentene-2, n-decene-1, 2-ethyl octene-1, 2-ethyl octene-2, n-decene-2, dodecene-1, 2-ethyl decene-1, 2-ethyl decene-2, dodecene-2, octadecene-1, octadecene-2, 2-methyl heptadecene-1, diisobutylene, eicosene-1, eicosene-2, 2-ethyl octadecene-1, docosene-1, docosene-2, triacontene-1, 2-ethyl octacosene-1, tetracontene-2, pentacontene-1, and the like.

Examples of cyclic monoolefins are cyclopentene, cyclohexene, cyclooctene, 1-methylcyclohexene, 1-butylcyclohexene, 1-methylcyclooctene, and the like.

Useful acyclic polyenes include 1,3-butadiene, 2-methyl-1,3-butadiene, 2,3-dimethyl-1,3-butadiene, 1,4-pentadiene, and the like. Some useful cyclic polyenes are cyclopentadiene, dicyclopentadiene, 1,3-cyclooctadiene, 1,3-cyclopentadiene, 1,4-octadiene, 1,3,5-cyclooctatriene, and the like.

The substituted olefins can have any substituents that do not interfere with the reaction. Examples of such substituents are halogens, alkoxy groups, aryloxy groups, aryl radicals, and the like. Illustrative examples of such olefins are 2-chloro-1,3-butadiene, vinyl chloride, allyl chloride, vinyl bromide, ethyl vinyl ether, phenyl vinyl ether, butyl vinyl ether, lauryl acrylate, methyl acrylate, indene, α-methyl styrene, 4-dodecyl styrene, 4-sec-octyl-α-methyl styrene, and the like.

In general, the preferred olefin reactants are the acyclic monoolefins containing from 2–50 carbon atoms, cyclic olefins containing from 5–10 carbon atoms, and aryl-substituted monoolefins containing from 8–20 carbon atoms. Especially preferred are the lower hydrocarbon monoolefins containing from 2 to about 6 carbon atoms such as ethylene, propylene, butene-1, isobutene, pentene-1, pentene-2, isopentene, hexene-1, hexene-2, 2-methyl pentene-1, cyclohexene, and the like.

The amount of olefin added to the aromatic amine will vary depending upon whether mono- or di-alkylation is desired. The precise amount is not a critical feature of the process. In general, from about 0.5 mole equivalent to 8 mole equivalents of olefin are added for each mole of aromatic amine. A most useful range is from about one mole equivalent to 3 mole equivalents of olefin for each mole equivalent of aromatic amine.

The process proceeds best at elevated temperatures. A useful range is from about 150–500° C. A preferred temperature range is from about 200–400° C., and best results are usually obtained at about 300–350° C.

The pressure under which the reaction is conducted is not an independent variable, and varies with the temperature and vapor pressure of the reactants. With the more volatile lower olefins such as ethylene, the reaction pressure will be quite high, while with the higher olefins only moderate pressures will be observed. Depending upon the reactants and the temperature, the pressure will range from about atmospheric to 3000 p.s.i.g.

The process should be conducted under a substantially inert atmosphere. Excessive amounts of oxygen or moisture will stop the alkylation by destroying the catalyst. This is not to say that the reactants need be absolutely anhydrous, but only that they should be substantially anhydrous. Also, the amount of oxygen in the reaction vessel should be minimized, generally by flushing the reaction vessel with an inert gas such as nitrogen, methane, ethane or propane, prior to conducting the reaction.

The reaction can be conducted in the presence of an inert solvent. Suitable solvents include aromatic and aliphatic hydrocarbons. Examples of useful aromatic hydrocarbons are toluene, xylene, mesitylene, and the like. Example of useful aliphatic hydrocarbons are hexane, n-octane, isooctane, decane, and the like.

Alkylation time depends on temperature, amount of catalyst and on the particular aromatic amine and olefin used. In general, the alkylation takes from one to 8 hours. A preferred reaction time is from one to 4 hours.

The amount of aluminum anilide type catalyst used in the reaction should be sufficient to catalyze the alkylation at a reasonable rate. The amount of catalyst is generally expressed in terms of the number of moles of aromatic amine per mole of aluminum in the form of aluminum anilide. Good results are generally obtained when from about 5–40 moles of aromatic amine are present for each mole of aluminum as an aluminum anilide. A preferred range is from about 7–25 moles of aromatic amine per mole of aluminum anilide.

The aluminum anilide catalyst is readily prepared by heating the aromatic amine directly with aluminum metal to form the aluminum anilide type compound of that particular amine. Another method is to react an alkali or alkaline earth metal anilide type compound with an aluminum halide, resulting in the metathetical elimination of an alkali or alkaline earth metal halide and forming the aluminum anilide catalyst. For example, the reaction of sodium anilide with aluminum chloride forms aluminum trianilide. Still another method is to react the aromatic amine with an aluminum alkyl such as triethyl aluminum, which evolves an alkane and forms aluminum trianilide.

It is sometimes desirable to add a Friedel-Crafts catalyst to the aromatic amine containing the aluminum anilide type catalyst prior to heating in the presence of an olefin. Suitable Friedel-Crafts catalysts include the conventional Lewis acids such as aluminum chloride, aluminum bromide, ferric chloride, boron trichloride, boron trifluoride, zinc chloride, titanium tetrachloride, zirconium chloride, gallium chloride, and the like. The Friedel-Crafts catalyst functions as a promoter. The amount used should be sufficient to promote the reaction to a rate higher than that obtained with the aluminum anilide catalyst alone. This amount can vary from about 0.001 to 0.05 mole part per mole of aromatic amine. A preferred range is from about 0.01 to 0.04 mole per mole of aromatic amine.

Another aluminum anilide type catalyst which can be used is an anilino aluminum halide. These result from the addition of alkyl aluminum halides to the aromatic amine prior to heating in the presence of olefin. Suitable alkyl aluminum halides that can be employed include the dialkyl aluminum halides, the alkyl aluminum dihalides, and the alkyl aluminum sesquihalides. Some examples of suitable dialkyl aluminum halides are:

dimethyl aluminum bromide
diethyl aluminum bromide
diethyl aluminum chloride
di-n-propyl aluminum chloride
diisobutyl aluminum iodide
diisoamyl aluminum chloride
di-n-dodecyl aluminum chloride
dieicosyl aluminum bromide Examples of useful alkyl aluminum dihalides include:

methylaluminum dichloride
ethyl aluminum dichloride
ethyl aluminum dibromide
n-propyl aluminum dichloride
isobutyl aluminum dibromide
n-hexyl aluminum dibromide
sec-decyl aluminum diiodide
n-dodecyl aluminum dichloride
n-eicosyl aluminum dibromide Both the above dialkyl aluminum halides and the alkyl aluminum dihalides are believed to exist in the form of dimers and these, of course, are included.

Alkyl aluminum sesquihalides have the empirical formula:

$$R_3Al_2X_3$$

in which R represents an alkyl group and X a halogen atom. Examples of useful alkyl aluminum sesquihalides includes:

methyl aluminum sesquichloride
methyl aluminum sesquibromide
ethyl aluminum sesquichloride
ethyl aluminum sesquibromide
ethyl aluminum sesquiiodide
n-propyl aluminum sesquichloride
n-propyl aluminum sesquibromide
isobutyl aluminum sesquichloride
isobutyl aluminum sesquiiodide
n-hexyl aluminum sesquiiodide
n-decyl aluminum sesquichloride
n-dodecyl aluminum sesquibromide
sec-eicosyl aluminum sesquichloride The above alkyl aluminum halides can be used individually or can be added to the aromatic amine as mixtures with good results. Frequently, due to their tendency to ignite on exposure to air, they are used in the form of solutions in inert solvents such as hydrocarbons or ethers. Particularly useful solvents are the hydrocarbons such as hexane, heptane, isooctane, benzene, toluene, xylene, and the like.

Although the preferred catalysts are the alkyl aluminum halides, the process can also be carried out using aryl aluminum hailded and, hence, these are considered equivalents. The alkyl aluminum halides are more readily available and are, accordingly, preferred.

The amount of alkyl aluminum halide added should be a catalytic amount. This means it should be sufficient to cause the olefin to alkylate the aromatic amine at a satisfactory rate under the reaction conditions employed. At higher temperatures and/or higher olefin concentrations, less catalyst is required. In general, good results are obtained if sufficient alkyl aluminum halide is added to the aromatic amine to provide one gram atom of aluminum for each 5–40 gram moles of aromatic amine, although more or less can be used. A most preferred operating range is the amount sufficient to provide one gram atom of aluminum for each 7–25 gram moles of aromatic amine.

The anilino aluminum halide which forms depends on the nature of the aromatic amine and the alkyl aluminum halide. For example, diethyl aluminum chloride added to aniline forms dianilino aluminum chloride with the evolution of ethane. Other anilino aluminum halides that can be formed in a similar manner include:

di(N-methylanilino) aluminum chloride
di(p-tert-butylanilino) aluminum bromide
di(p-chloroanilino) aluminum iodide
di(4-bromoanilino) aluminum bromide
di(4-sec-eicosylanilino) aluminum chloride
2-methyl-4-tert-butylanilino aluminum dichloride
N-eicosylanilino aluminum dibromide
di(N-n-butyl-4-tert-octylanilino) aluminum iodide
di(N-n-dodecyl-4-sec-tetradecylanilino) aluminum chloride
N-phenyl-4-tert-butylanilino aluminum bromide
α-naphthylamino aluminum dichloride
β-naphthylamino aluminum dibromide
α-anthraceneamino aluminum dichloride
3-phenanthreneamino aluminum diiodide
1-chryseneamino aluminum dibromide
N-(4-methylphenyl)-4-sec-tetradecylanilino aluminum dichloride
di(α-naphthylamino) aluminum chloride
dianilino aluminum chloride
dianilino aluminum bromide
dianilino aluminum iodide
anilino aluminum dichloride
anilino aluminum dibromide
anilino aluminum diiodide
2-methyl anilino aluminum diiodide
di(4-tert-butylanilino) aluminum bromide
di(4-tert-tetradecylanilino) aluminum chloride
di(4-sec-octadecyl anilino) aluminum bromide
di(4-chloroanilino) aluminum chloride
3-bromoanilino aluminum dibromide
2-methyl-5-methoxyanilino aluminum diiodide
4-butoxyanilino aluminum dibromide When the alkyl aluminum halide is added to aniline itself, which is a preferred embodiment of this process, anilino aluminum halides will form. For example, when diethyl aluminum chloride is added to aniline and the mixture heated in preparation for conducting the orthoalkylation process, a reaction occurs forming dianilino aluminum chloride. Likewise, when ethyl aluminum dichloride is added to aniline and the mixture heated, anilino aluminum dichloride forms. Similarly, the addition of ethyl aluminum sesquichloride or methyl aluminum sesquichloride to aniline leads to the formation of a mixture of dianilino aluminum chloride and anilino aluminum dichloride.

After the alkylation is complete the alkylation mixture is distilled without additional water or any other treatment which would cause decomposition of the aluminum anilide type catalyst. The distillation can be direct from the same vessel used in the alkylation, or the alkylation mixture can be transferred to a separate distillation vessel. One advantage of distilling directly from the alkylation vessel is that the residue remaining is the active aluminum anilide type catalyst and subsequent alkylations can be carried out after the distillation by merely adding more aromatic amine and olefin and then heating to an alkylation temperature. However, if the reaction vessel is not adapted for simple distillation, the alkylation mixture can be transferred to a separate distillation vessel. The alkylated aromatic amines are then distilled from the vessel and the residue remaining containing the active catalyst can be either discarded or can be recycled back to the alkylation vessel. This is done at an elevated temperature of about 100° C. in order to maintain the residue in a liquid form. It is sometimes desirable to include a small amount of a high boiling hydrocarbon as a diluent to aid in recycle, or to add the aromatic amine to the catalyst residue to facilitate transfer to the alkylation vessel for use in the next alkylation.

The distillation may be conducted at atmospheric pressure or under reduced pressure. The lower boiling alkylated aromatic amines such as diethylaniline are readily distilled from the alkylation mixture at atmospheric pressure, although reduced pressure can be used. With the higher boiling aromatic amines, especially the polynuclear aromatic amines, it is generally preferred to conduct the distillation at reduced pressure. A useful range is from about 0.1 mm. Hg up to atmospheric pressure.

After the distillation the residue containing active catalyst can be recycled back to the next alkylation. There is usually some small loss in catalytic activity from run to run, which can be remedied by adding a small amount of new catalyst to each subsequent alkylation. This make-up catalyst can be made by any of the methods previously described, but the preferred method is to merely add sufficient aluminum alkyl or alkyl aluminum halide as previously described to bring the catalytic activity up to the proper level. The amount of make-up catalyst added is best determined experimentally because it depends to some extent on the amount of air or water exposure given the alkylation mixture. In general, from about 10–25 percent of the normal catalyst level added after each alkylation will maintain a satisfactory reaction rate, although more or less may be used. After many recycles the amount of residue left after distilling out the alkylated aromatic amine will generally increase to an unacceptable level due to the constant addition of make-up catalyst. This is readily remedied by merely withdrawing the excess from the simple distillation residue and either discarding it or hydrolyzing it and recovering its aromatic amine value.

The following examples will serve to illustrate the manner in which the process is carried out. It will be apparent to any chemist or chemical engineer that each procedure shown can readily be adapted to process a variety of aromatic amines. All parts are by weight unless otherwise specified.

Example 1

In a pressure reaction vessel fitted with a stirrer was placed 600 parts of aniline, 10 parts of granular aluminum and 0.04 part of mercuric chloride. The mixture was heated to 180° C., at which temperature the aluminum and aniline reacted to form aluminum anilide. Evolved hydrogen was vented and the reaction temperature raised to 340° C. Ethylene was pressurized into the vessel up to 800 p.s.i.g. and maintained at 600–800 p.s.i.g. for 3.75 hours. The vessel was then cooled, vented, and the contents transferred under nitrogen to a distillation vessel. A distillation was conducted up to a liquid temperature of 302° C. The residue was returned to the pressure vessel for further use.

A total of 700 parts of volatiles were recovered which contained 127 parts of aniline, 261.5 parts of 2-ethylaniline and 285.8 parts of 2,6-diethylaniline.

Example 2

Into the pressure vessel of Example 1 containing the residue from the distillation of Example 1 was placed 600 parts of aniline and no further catalyst. It was heated to 340° C. and alkylated in the same manner as in Example 1. After the alkylation the reaction mixture was transferred to a distillation vessel. A distillation yielded 773.3 parts of distillate which contained 180 parts of aniline, 310.3 parts of 2-ethylaniline and 257.6 parts of 2,6-diethylaniline.

Example 3

In a pressure reaction vessel fitted with a stirrer was placed 600 parts of aniline, 10 parts of granular aluminum and 0.01 part of mercuric chloride. The mixture was heated to 180° C., and after hydrogen evolution stopped, it was vented, sealed, and then heated to 340° C. Ethylene was added until the pressure reached 800 p.s.i.g. and was maintained at 600–800 p.s.i.g. for about 3.6 hours. The vessel was then cooled and vented. A simple distillation apparatus was fitted directly to the pressure vessel and the volatiles distilled directly from the vessel at 100 mm. Hg, up to a liquid temperature of 225° C.

Following this, 600 parts of aniline were added to the residue remaining in the vessel and the alkylation procedure repeated as before. A total of four cycles were conducted. In the fourth cycle, 2.5 parts of granular aluminum were added to make additional catalyst, since the alkylation rate was decreasing. The product composition obtained in each cycle is shown in the following table.

| Cycle | Product composition | | |
|---|---|---|---|
| | Aniline | 2-ethyl-aniline | 2,6-diethyl-aniline |
| 1 | 138.2 | 257 | 263.4 |
| 2 | 209.4 | 308.6 | 218.5 |
| 3 | 257.4 | 307 | 188.7 |
| 4 | 195.5 | 327.3 | 209 |

The above shows that if the hydrolysis is omitted the catalyst can be used in succeeding cycles. The following example shows the high purity which can be obtained if the alkylation is carried to completion and the alkylated product distilled from the active catalyst.

Example 4

In a pressure reaction vessel was placed 54 parts of aniline. The vessel was flushed with nitrogen, and over an 11 minute period 3.5 parts of diethyl aluminum chloride were added. The temperature rose from 22 to 33° C. The vessel was sealed and heated to 155° C. (175 p.s.i.g.). The evolved ethane was vented. The vessel was heated while stirring. At 184° C. ethylene was introduced up to 300 p.s.i.g. Heating was continued to 321° C. During the next 3 hours and 45 minutes the pressure was maintained between 470 and 1000 p.s.i.g. and the temperature between 298 and 340° C. A total of 35.6 parts of ethylene were consumed in maintaining the pressure. The vessel was then cooled and vented. The reaction mixture was transferred to a distillation vessel. It was rapidly distilled until no further volatiles came over. Analysis of the distillate by vapor phase chromatography showed it to be:

| | Percent |
|---|---|
| Aniline | Trace |
| 2-ethylaniline | 0.5 |
| 2,6-diethylaniline | 97.4 |
| 2-ethyl-6-butylaniline | 1.6 |
| Unknowns | 0.1 |

The residue remaining is suitable for use as a catalyst in subsequent alkylations of aromatic amines.

Example 5

In a pressure reaction vessel as used in Example 1 place 10 mole parts of α-naphthylamine, and slowly add 0.5 mole part of ethyl aluminum sesquichloride. Seal and, while stirring, heat to 200° C. Vent and heat to 300° C. Pressurize with ethylene to 750 p.s.i.g. and continue stirring at 350–370° C. and 750–1000 p.s.i.g. ethylene for 4 hours. Cool to 150° C. and vent. Fit the vessel with a distillation apparatus having a demister and reduce the pressure in the system to 50 mm. Hg. Rapidly distill the volatiles up to a liquid temperature of 250° C. The distillate consists mainly of 2-ethyl-α-naphthylamine.

Other aromatic amines can be alkylated following the above procedure. For example, N-methylaniline will form primarily N-methyl - 2,6 - diethylaniline. Para-sec-dodecylaniline forms 2,6 - diethyl - 4 - sec-dodecylaniline. Para-phenylene diamine forms principally 2,3,5,6-tetraethyl-p-phenylene diamine.

Likewise, other olefins can be employed to give the corresponding alkyl substitution. For example, propylene gives isopropyl substitution. Butene gives sec-butyl substitution. Isobutene gives tert-butyl substitution, and cyclohexene gives cyclohexyl substitution.

Example 6

In a reaction vessel as described in Example 1 place 10 mole parts of aniline, 0.6 mole part of aluminum and 0.2 mole part of aluminum chloride. Seal and heat the mixture to about 180° C. Cool to 100° C. and vent. Seal and, while stirring, heat to 150° C. Pressurize with ethylene to 500 p.s.i.g. and slowly heat to 300° C. over an hour period. Then maintain at 300–400° C. and 700–1000 p.s.i.g. for an additional 2 hours and then cool to 100° C. Vent and transfer to a distillation vessel. Distill at 100 mm. Hg to a liquid temperature of 225° C. Return the residue to the pressure vessel under a nitrogen atmosphere. The distillate is substantially all 2,6-diethylaniline.

Other Friedel-Crafts catalysts can be used in the above example in place of aluminum chloride such as titanium tetrachloride, zinc chloride, ferric chloride, zirconium chloride, aluminum bromide, boron trichloride, boron trifluoride, and the like.

Example 7

To the pressure vessel of Example 6 containing the distillation residue and 0.06 mole part of aluminum and 0.02 mole part of aluminum chloride. Then add 10 mole parts of aniline and heat to 180° C. Cool to 100° C., vent and then alkylate and distill as in Example 6.

Examples 8–17

Repeat the procedure of Example 7 through 10 cycles.

Alkylated aromatic amines are useful in a broad range of applications. For example, they are antiknock agents in gasoline used in spark ignited internal combustion engines. They are also valuable intermediates in the dye industry. They are beneficial when added to rubber wherein they prevent degradation caused by ozone. Another use in particular for anilines substituted in an ortho position with an ethyl radical is in the preparation of indole and indole derivatives. For example, orthoethylaniline is converted to indole by contact with a titanium dioxide catalyst at a temperature of around 600° C. (U.S. 2,886,573). The orthoalkylated amines are also useful as intermediates for herbicides. For example, 2,6-dialkyl anilines such as 2,6-diethylaniline are an intermediate in the preparation of the plant growth regulators described in U.S. 3,403,994.

I claim:

1. In a process for selectively orthoalkating the nucleus of an aromatic amine having at least one hydrogen atom on a carbon atom ortho to an amino group and having at least one hydrogen atom on said amino group, said process comprising heating said aromatic amine with an olefin in the presence of an aluminum anilide catalyst to a temperature of from about 150–500° C., thereby forming a reaction mixture containing orthoalkylated aromatic amines, the improvement comprising distilling said orthoalkylated aromatic amines from said reaction mixture without hydrolysis.

2. A process of claim 1 wherein said olefin is a lower hydrocarbon monoolefin containing from 2 to about 6 carbon atoms.

3. A process of claim 2 wherein said olefin is ethylene.

4. A process of claim 1 wherein said aromatic amine is a mononuclear primary aromatic amine.

5. A process of claim 4 wherein said aromatic amine is aniline.

6. A process of claim 1 wherein a promoter amount of a Friedel-Crafts catalyst is added to said aromatic amine prior to heating said aromatic amine with an olefin in the presence of an aluminum anilide catalyst.

7. A process of claim 6 wherein said aromatic amine is aniline and said olefin is ethylene.

8. A process of claim 7 wherein said Friedel-Crafts catalyst is aluminum chloride.

9. A process of claim 1 wherein said aluminum anilide catalyst is aluminum trianilide.

10. A process of claim 1 wherein said aluminum anilide catalyst is a haloaluminum anilide.

11. A process of claim 10 wherein said haloaluminum anilide is dianilido aluminum monochloride.

12. A process of claim 11 wherein said aromatic amine is aniline.

13. A process of claim 12 wherein said olefin is ethylene.

14. A process of claim 1 wherein said aluminum anilide catalyst is the residue remaining after distilling said orthoalkylated products from said reaction mixture of a previous alkylation carried out according to claim 1.

15. A process of claim 14 wherein said aromatic amine is aniline and said olefin is ethylene.

16. A process of claim 15 wherein in said previous alkylation carried out according to claim 1 said aluminum anilide catalyst is aluminum trianilide.

17. A process of claim 15 wherein in said previous alkylation carried out according to claim 1 said aluminum anilide catalyst is a haloaluminum anilide.

18. A process of claim 15 wherein in said previous alkylation carried out according to claim 1 a promoter amount of aluminum chloride is added to said aromatic amine prior to heating said aromatic amine with an olefin in the presence of an aluminum anilide catalyst.

References Cited

UNITED STATES PATENTS

| | | | |
|---|---|---|---|
| 2,039,391 | 5/1936 | Carleton et al. | 260—178 |
| 2,762,845 | 9/1956 | Stroh et al. | 260—578 |
| 2,814,646 | 11/1957 | Kolka et al. | 260—570 X |
| 3,275,690 | 9/1960 | Stroh et al. | 260—578 X |

FOREIGN PATENTS

| | | | |
|---|---|---|---|
| 846,226 | 8/1960 | Great Britain | 260—578 |
| 620,573 | 5/1961 | Canada | 260—578 |

ROBERT V. HINES, Primary Examiner

U.S. Cl. X.R.

260—448 R, 570 R, 570 D, 571, 574, 575, 576, 577